United States Patent
Tsuda

Patent Number: 6,044,277
Date of Patent: Mar. 28, 2000

[54] DEMAND-ASSIGNED SATELLITE COMMUNICATIONS SYSTEM

[75] Inventor: Hiroki Tsuda, Tokyo, Japan

[73] Assignee: NEC Corporation, Japan

[21] Appl. No.: 08/827,302

[22] Filed: Mar. 28, 1997

[30] Foreign Application Priority Data

Mar. 28, 1996 [JP] Japan .................................. 8-073914

[51] Int. Cl.[7] .................................................. H04Q 7/20
[52] U.S. Cl. ................................. 455/522; 455/13.4
[58] Field of Search ................................ 455/12.1, 13.4, 455/67.1, 67.6, 403, 430, 504, 505, 506, 507, 511, 522, 571, 423

[56] References Cited

U.S. PATENT DOCUMENTS

| | | | |
|---|---|---|---|
| 4,287,598 | 9/1981 | Landseth et al. | 455/12.1 |
| 4,613,990 | 9/1986 | Halpern | 455/436 |
| 4,616,108 | 10/1986 | Yamaguchi et al. | 455/12.1 |
| 5,073,900 | 12/1991 | Mallinckodt | 455/430 |
| 5,485,486 | 1/1996 | Gilhousen et al. | 455/522 |
| 5,564,074 | 10/1996 | Juntti | 455/522 |
| 5,566,225 | 10/1996 | Haas | 455/423 |
| 5,590,409 | 12/1996 | Sawahashi et al. | 455/522 |
| 5,619,209 | 4/1997 | Horstein et al. | 455/430 |
| 5,717,686 | 2/1998 | Schianovi | 455/12.1 |
| 5,749,044 | 5/1998 | Natarajan et al. | 455/12.1 |
| 5,768,312 | 6/1998 | Imamura | 455/67.7 |
| 5,802,445 | 9/1998 | Wiedeman et al. | 455/12.1 |

*Primary Examiner*—William G. Trost
*Assistant Examiner*—Jean A. Gelin
*Attorney, Agent, or Firm*—Ostrolenk, Faber, Gerb & Soffen, LLP

[57] ABSTRACT

A mobile station comprises a power detector, an averaging circuit, and a signal fade detector. The power detector measures a channel signal power (receive signal power) of a receive signal received by a receiver. The averaging circuit averages the receive signal power measured by the power detector. The signal fade detector detects the fade of the channel signal power with the average of the receive signal power. When the fade of the receive signal is detected, while a call request or a call response is being transmitted, after the receive signal power is recovered, a control circuit of the mobile station re-transmits the call request or the call response. When the fade of the receive signal is detected just before a call request or a call response is to be transmitted, the control circuit of the mobile station stops transmitting the call request or the call response. After the receive signal power is recovered, the control circuit of the mobile station transmits the call request or the call response.

8 Claims, 6 Drawing Sheets

FIG. 1 PRIOR ART

FIG. 2 PRIOR ART
NETWORK CONTROL STATION

DEMAND-ASSIGNED SATELLITE COMMUNICATIONS SYSTEM

BACKGROUND OF THE INVENTION

1. Field of the Invention

The present invention relates to a communications method and communications system, and particularly to demand-assigned satellite communications systems which provide voice, facsimile, data and other digital transmission services.

2. Description of the Related Art

Figure 1:
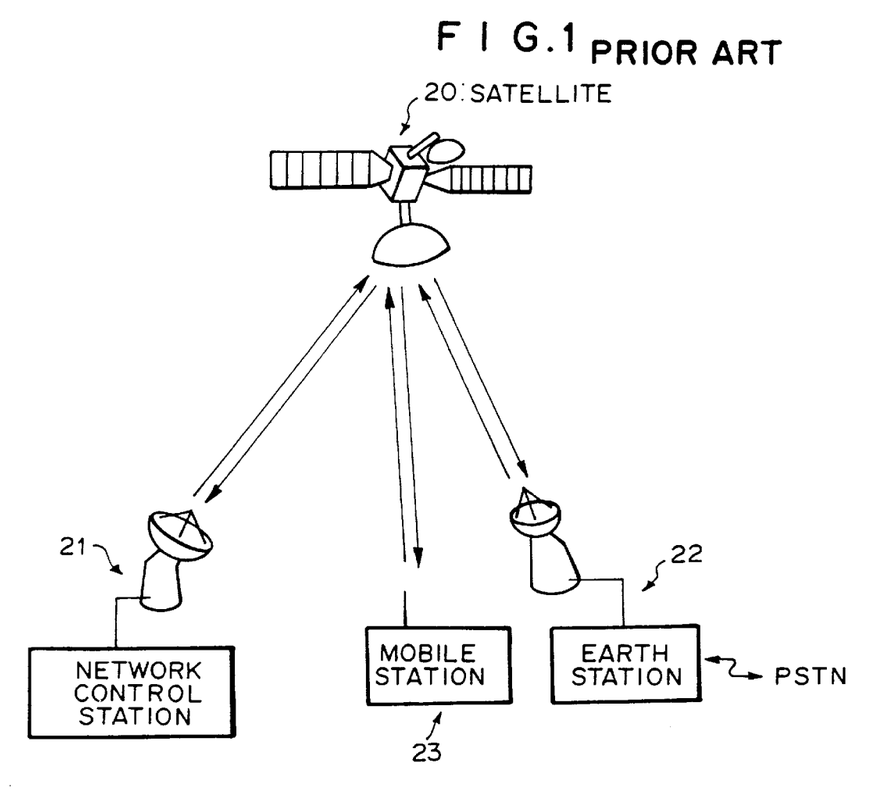
FIG. 1 is an example of a network configuration showing the structure of a satellite communication system according to the prior art and the present invention.

FIG. 1 is an example of a network configuration showing a communications system according to a conventional system. In FIG. 1, reference numeral 20 is a communications satellite. The satellite generally comprises a receiver receiving transmitted signals from earth stations, a frequency converter for converting frequencies, and a transmitter for transmitting to earth stations. The earth stations comprise a network control station 21, an earth station 22, and mobile stations 23.

Figure 2:
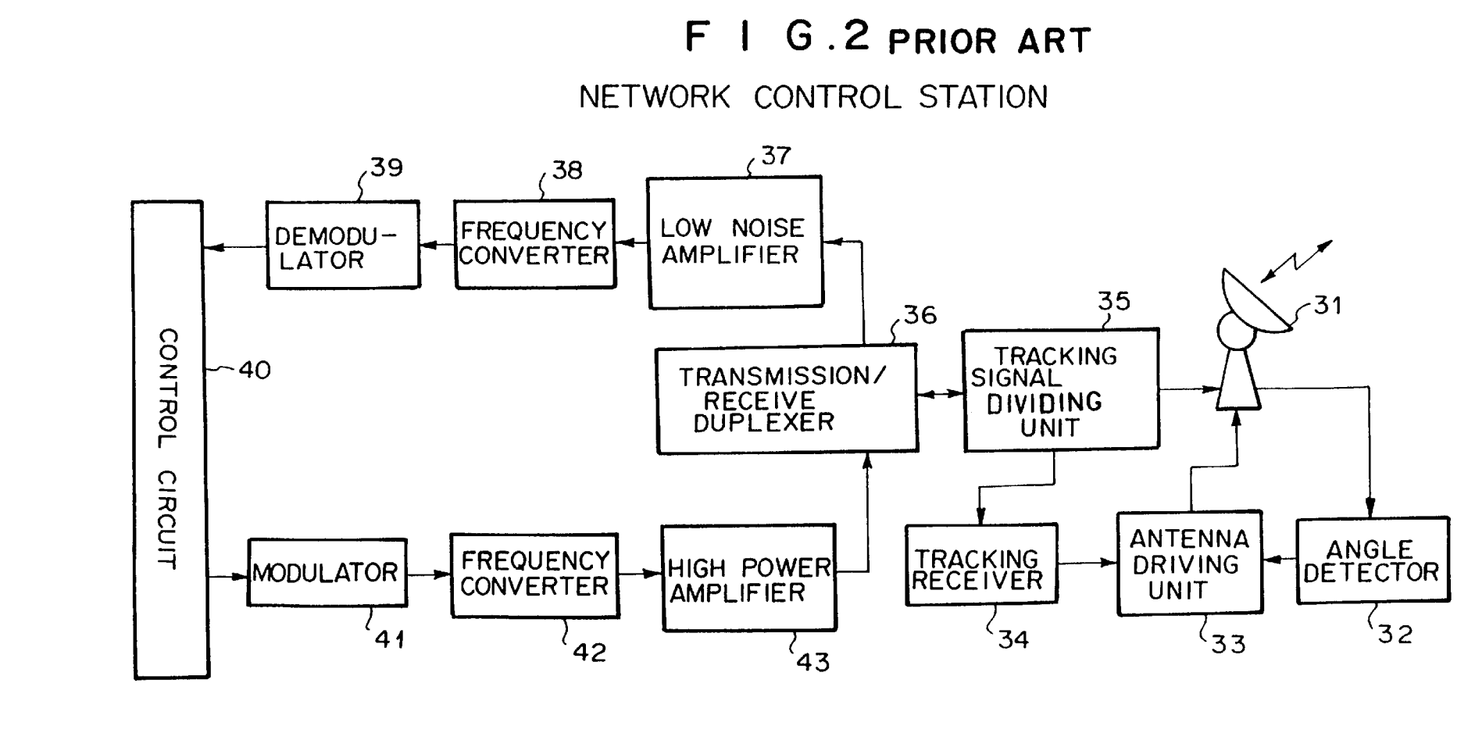
FIG. 2 is a block diagram showing an outlined structure of a network control station according to the prior art present invention.

FIG. 2 is a block diagram showing the structure of the network control station 21. In FIG. 2, an antenna 31 is controlled to the direction of the satellite 20 by a control servo loop which comprises a tracking signal wave dividing unit 35, a tracking receiver 34, an angle detector 32 and an antenna driving unit 33.

In FIG. 2, the control signal received from the antenna 31 is sent to a transmission/receive duplexer 36 and obtained as a control receive signal. The control receive signal is sent to a low noise amplifier 37. The resultant signal is sent to a frequency converter 38. The frequency converter 38 converts the frequency of the amplified signal into an intermediate frequency. The resultant signal is sent to a demodulator 39. The demodulator 39 demodulates a TDMA (Time Division Multiple Access) control signal. An output signal of the demodulator 39 is sent to a controlling circuit 40. The controlling circuit 40 searches for a proper channel and converts data thereof into a control signal, for example, a call request or a call response. The control signal is sent to a modulator 41. The modulator 41 modulates the output signal, for example, an assigned channel or the like, of the controlling circuit 40. The resultant signal is sent to a frequency converter 42. The frequency converter 42 converts the output signal of the modulator 41 into a control radio frequency signal. The resultant signal is sent to a high power amplifier 43. The high power amplifier 43 amplifies the power of the radio frequency signal. The resultant signal is sent to the antenna 31 through the transmission/receive duplexer 36 and the tracking signal dividing unit 35. The resultant signal is sent from the antenna 31 to the communication satellite 20.

In the above conventional construction, further, the demand assigned communication system presents the following situation.

A demand assignment FDMA (Frequency Division Multiple Access) satellite communications system comprises a network control station that manages and controls a communications system, earth stations connected to a public switched telephone network (PSTN) and/or private networks and mobile stations/mobile terminals from which users access the satellite communication network.

The network control station monitors the entire network. In addition, the network controlling station successively sends channel control information that has been time-division multiplexed to a satellite using a forward link (also referred to as a forward channel or an outbound channel). The time-division multiplex (TDM) information includes information of network status, network control signals and call announcements. An earth station and/or a mobile station/terminal receives the channel control information that has been sent as the TDM information from the network control station. Corresponding to the channel control information, the earth station and/or the mobile station/terminal performs a call request and/or a call response using a return link (also referred to as a return channel or an inbound channel). A call request and/or a call response is sent in predetermined time slots from the earth station and/or the mobile station/terminal based on time division multiple access (TDMA) method corresponding to the TDM network control information.

When the network control station receives a call request or a call response from an earth station or a mobile station/terminal, the network control station informs the earth station and the mobile station/terminal of an available communication channel through the signalling channel. When the earth station and the mobile station/terminal has received the assigned communication channel information, it sets the assigned channel and switches from the signalling channel to the communication channel. With a predetermined process sequence, the mobile station/terminal is connected to the earth station by PSTN or a private service network through the satellite.

In a mobile satellite communications system that communicates with a mobile station installed in a car, a truck, or the like, due to receive signal fading by buildings and other obstacles on a transmission pass (namely, the shadowing between the mobile station and the satellite), a call request and/or a call response may not be sent from the mobile station to the earth station. To solve such a problem, several methods have been proposed. As a first method (referred to as A method), the call request or the call response is repeatedly sent for a predetermined number of times assigned as a parameter of the system. As a second method (referred to as B method), after a mobile station has sent a call request or a call response to the network control station, if relevant control information is not received in a predetermined time period, the call request or the call response is resent.

In the A method, the number of times that the call request or the call response is sent increases. Further, the probability of a transmission burst being blocked by shadowing decreases, but if plural transmission bursts are continuously sent, the probability of receiving the call request or the call response increases. Thus, the possibility of the call being successfully connected increases.

In the B method, after a mobile station has sent a call request or a call response to the network control station, if the network control station does not detect the call request or the call response and an earth station does not recognize it, the mobile station repeatedly sends the call request or the call response at a predetermined interval. Thus, the probability of the network control station detecting the call request or the call response and the earth station receiving it increases.

However, in the A method, although the success rate of the call connection increases, since the same information is repeatedly sent, the transmission efficiency deteriorates. In addition, the power consumption of the mobile station increases. Moreover, since the access amount of the mobile station increases, the probability that call requests and call responses of various mobile stations conflict increases.

Thus, in the A method, the call connections are not effectively performed.

On the other hand, in the B method, after a mobile station has sent a call request or a call response to a satellite, if the network control station does not recognize the call request or the call response, the mobile station repeatedly sends the call request or the call response at a predetermined interval. Thus, in the B method, since the mobile station has to wait, it takes a long time to perform a network connection.

SUMMARY OF THE INVENTION

The present invention is made to solve such a problem. An object of the present invention is to provide a communication system that allows the success rate of call connections to increase free of decrease of transmission efficiency, increase of power consumption of mobile stations, disturbance of effective call connections, and increase of call connecting time.

To accomplish the above-described object, a first aspect of the present invention is a satellite communication method based on a demand-assignment access, comprising the steps of detecting a receive power of TDM channel control signals successively transmitted from a network control station by a mobile station, when the decrease of the receive power of the channel control signal is detected, after the receive power is recovered, re-transmitting the call request or the call response by the mobile station.

According to the first aspect of the present invention, the mobile station detects the receive power of a TDM channel control signal successively transmitted from the network control station. When the mobile station detects the decrease of the receive signal power of the channel control signal, while a call request or a call response is being transmitted, the mobile station determines that the shadowing takes place between the mobile station and the satellite due to a blocking. After the receive signal power is recovered, the mobile station re-transmits the call request or the call response.

A second aspect of the present invention is a satellite communication method based on a demand network assignment access, comprising the steps of detecting a receive signal power of a channel control signal successively transmitted from a network control station by a mobile station and just before a call request or a call response is transmitted, when the decrease of the receive signal power of the channel control signal is detected, stopping transmitting the call request or the call request and after the receive signal power is recovered, transmitting the call request or the call response by the mobile station.

According to the second aspect of the present invention, the mobile station detects the receive signal power of the channel control signal successively transmitted from the network control station. When the mobile station detects the decrease of the receive signal power of the network control signal, just before a call request or a call response is being transmitted, the mobile station determines that the shadowing takes place between the mobile station and the satellite due to a blocking and stops transmitting the call request or the call response. After the receive signal power is recovered, the mobile station re-transmits the call request or the call response.

A third aspect of the present invention is a satellite communication method based on a demand network assignment access, comprising the steps of detecting a receive signal power of a channel control signal successively transmitted from a network control station by a mobile station, while a call request or a call response is being transmitted, when the decrease of the receive signal power of the network control signal is detected, after the receive signal power is recovered, re-transmitting the call request or the call response by the mobile station and just before a call request or a call response is transmitted, when the decrease of the receive signal power of the network control signal is detected, stopping transmitting the call request or the call request and after the receive signal power is recovered, transmitting the call request or the call response by the mobile station.

According to the third aspect of the present invention, the mobile station detects the receive signal power of the channel control signal successively transmitted from the network control station. When the mobile station detects the decrease of the receive signal power of the network control signal, while a call request or a call response is being transmitted, the mobile station determines that the shadowing takes place between the mobile station and the satellite due to a blocking. After the receive signal power is recovered, the mobile station re-transmits the call request or the call response. When the mobile station detects the decrease of the receive signal power of the network control signal, just before a call request or a call response is being transmitted, the mobile station determines that the shadowing takes place between the mobile station and the satellite due to a blocking and stops transmitting the call request or the call response. After the receive signal power is recovered, the mobile station re-transmits the call request or the call response.

A fourth aspect of the present invention is the method as set forth in the first, second, and third aspects of the present invention, wherein the mobile station includes a measuring means for measuring a carrier power to noise power ratio (C/N) and a means for controlling the average amount of the receive signal power of the channel control signal corresponding to the ratio of carrier power and noise power measured by the measuring means.

According to a fourth aspect of the present invention, a carrier power and noise power ratio (C/N) is measured. Corresponding to the measured C/N ratio, the average amount of the receive signal power of the channel control signal is controlled.

These and other objects, features and advantages of the present invention will become more apparent in light of the following detailed description of a best mode embodiment thereof, as illustrated in the accompanying drawings.

DESCRIPTION OF PREFERRED EMBODIMENT

An embodiment of the present invention will be described with reference to the accompanying drawings.

Figure 3:
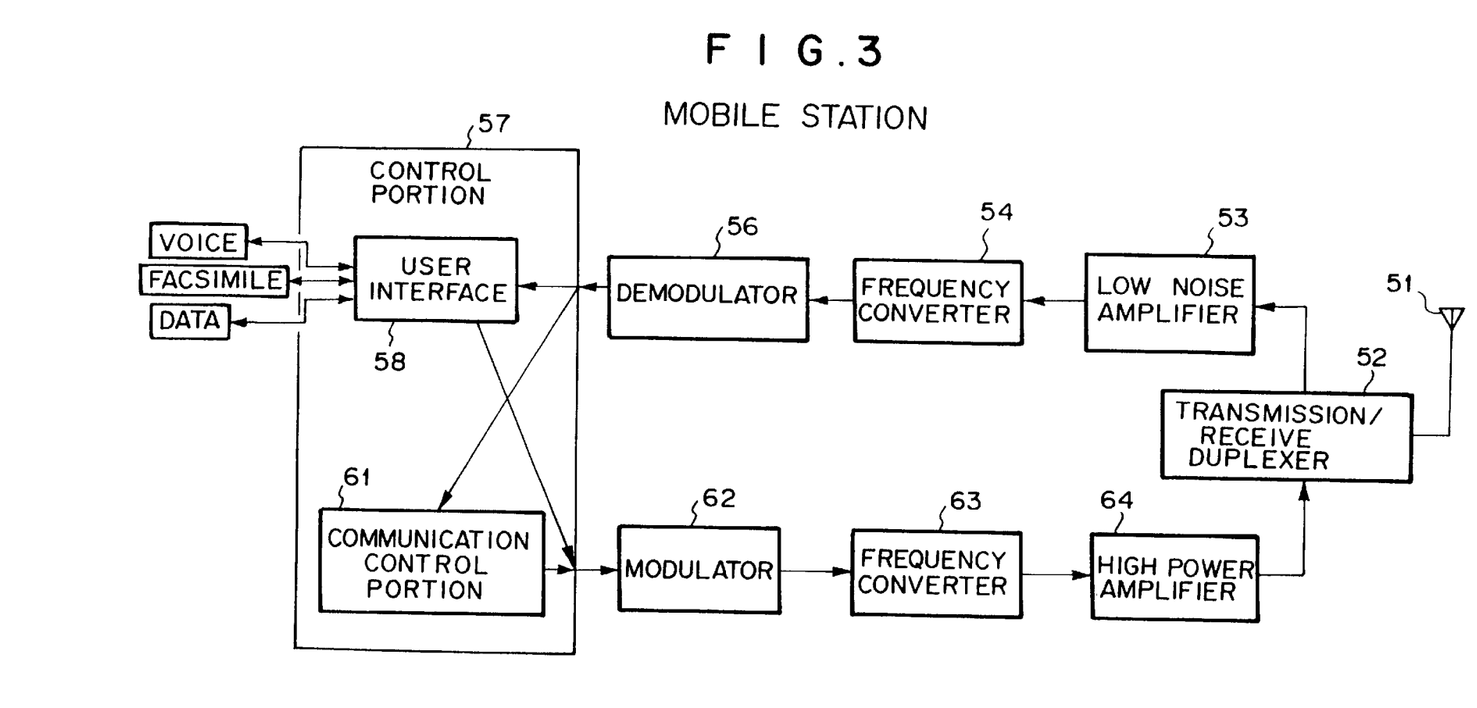
FIG. 3 is a block diagram showing an outline structure of a mobile station according to the present invention.

FIG. 3 is a block diagram showing the structure of a mobile terminal as the mobile station 23. In FIG. 3, channel control signals and communication signals are received from the communications satellite 20 by an antenna 51. The receive signals are sent to a transmission/receive duplexer 52. The resultant signal is sent to a control portion 57 through a low noise amplifier 53, a frequency converter 54, and a demodulating portion 56. When the receive signal is a channel control signal, the control portion 57 sends the signal to a communications control portion 61. When the receive signal is a communications signal, the control portion 57 sends the signal to a user interface 58. The user interface 58 is connected to provide and receive voice, facsimile and data so as to exchange a signal with the communication channels.

A communications controlling portion 61 accesses network system so as to transmit a call request signal and/or a call response signal to the network control station 21 or an earth station 22. In addition, the communications control portion 61 is assigned a channel by the network control station 21 and controls the high power amplifier 64 and the frequency converter 54. The control signalling information that is sent from the control portion 57 to the modulator 62 is modulated. A frequency converter 63 converts the frequency of the output signal of the modulator 62 into an assigned frequency. A high power amplifier 64 amplifies the output signal of the frequency converter 63 as a radio frequency signal. The radio frequency signal is sent to the antenna 51 through the transmission/receive duplexer 52. The radio frequency signal is radiated from the antenna 51 to the communications satellite 20.

Figure 4:
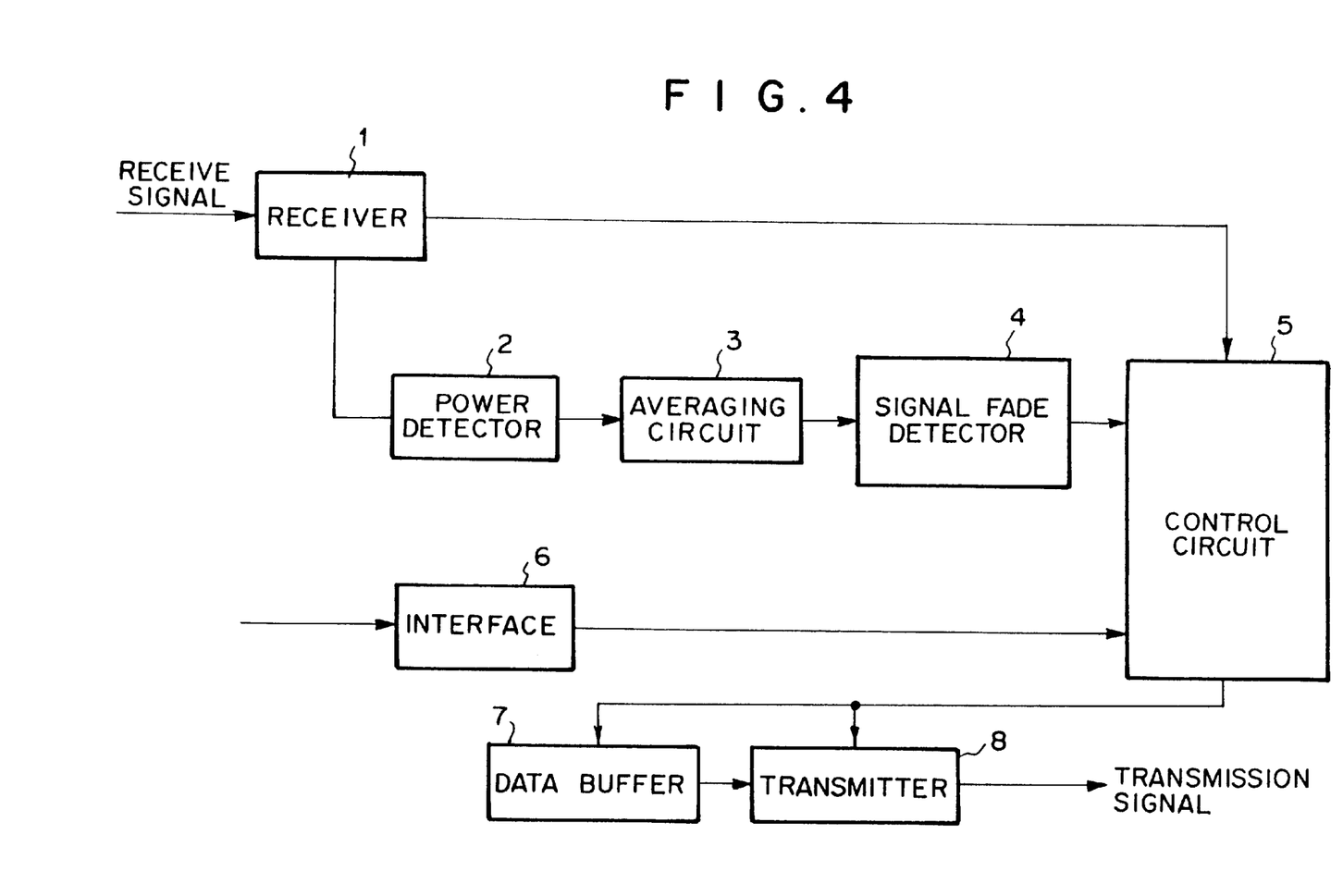
FIG. 4 is a block diagram showing principal portions of the mobile station of the satellite communication system according to the present invention.

FIG. 4 is a block diagram showing principal portions of the mobile station of the satellite communications system according to the present invention. In FIG. 4, reference numeral 1 is a receiver that receives a digitally modulated signal. Reference numeral 2 is a power detector that measures the power of the signal received by the receiver 1. Reference numeral 3 is an averaging circuit that averages the receive signal power measured by the power detector 2. Reference numeral 4 is a signal fade detecting circuit that detects the fade of the receive signal corresponding to the average of the receive signal power. Reference numeral 5 is a control circuit. Reference numeral 6 is an interface to transmit/receive voice, facsimile and data. Reference numeral 7 is a data buffer that stores data to be transmit. Reference numeral 8 is a transmitter.

The receiver 1 comprises a low noise amplifier, a frequency converter, a detector, and a demodulator (not shown). The transmitter 8 comprises an encoder, a modulator, a frequency converter, and a high power amplifier (not shown). The encoder executes such functions as encoding for an error correction, a differential encoding process, and a scrambling process. The modulator digitally modulates transmission data. The frequency converter converts the frequency of the modulated transmission data into the radio frequency. The high power amplifier amplifies the power of the transmission signal.

Next, with reference to the function of the control circuit 5, the operation of the mobile station will be described. The digitally modulated signal transmitted from the network control station (not shown) is received by the receiver 1. In the receiver 1, the low noise amplifier amplitudes the receive signal. A frequency converter converts the radio frequency into the base band frequency. In addition, the frequency converter performs a quasi-coherent detection for the receive signal. A demodulator extracts data by a coherent detection. When the coherent detection is used to demodulate digitally modulated signals such as PSK modulation in satellite communications, the demodulator recovers a carrier by power operation method, Costas loop method, inverse modulation method, or the like. A clock signal is recovered by square detecting method, envelop detecting method, zero-cross detecting method, or the like. The data from the demodulated signal which has been encoded by encoding with an error correction, differential encoding process, and scrambling process is decoded by a decoder. In such a manner, the receiver 1 recovers data and outputs the reproduced data to the control circuit 5.

Figure 5:
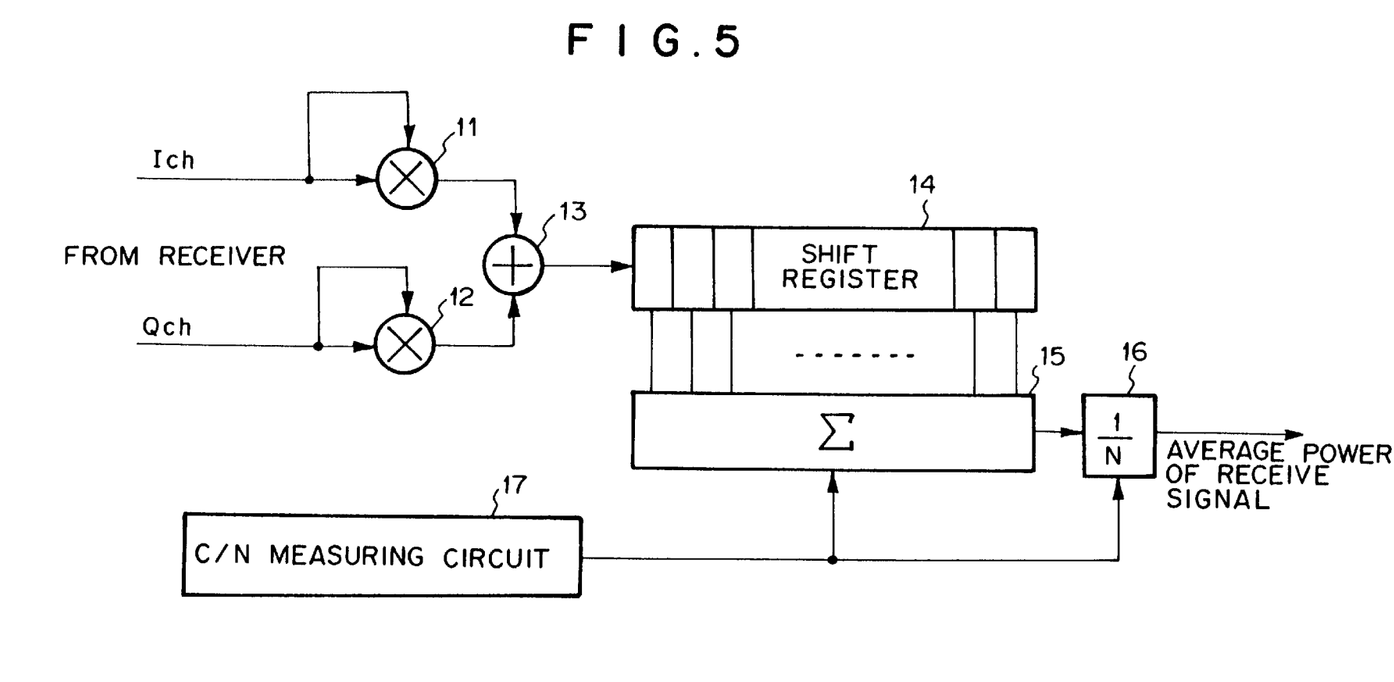
FIG. 5 is a block diagram showing an example of the structure of a power detector and an averaging circuit of the mobile station.

The power detector 2 calculates the power of the receive signal (receive signal power) with the square sum of an I channel signal and a Q channel signal that are quasi-coherent detected by a quasi-coherent detection of the receiver 1. The receive signal power calculated by the power detector 2 is averaged by the averaging circuit 3. The averaging circuit 3 averages the receive signal power. The average time (the number of average samples) is optimized with the operational carrier power to noise power ratio (C/N) and the response speed. Thus, with a C/N measuring function, the average time (average amount) can be controlled with the C/N measured value. FIG. 5 is a block diagram showing the structure of the power detector 2 and the averaging circuit 3. In FIG. 5, reference numerals 11 and 12 are multiplying devices. Reference numeral 13 is an adding device. Reference numeral 14 is a shift register. Reference numeral 15 is a cumulating device. Reference numeral 16 is a dividing device. Reference numeral 17 is a C/N measuring circuit.

In FIG. 5, the I channel signal and the Q channel signal that are performed by the quasi-coherent detection are squared by the multiplying devices 11 and 12, respectively. The sum of the squares of the resultant signals is obtained by the adding device 13. The resultant square sum signal is sent to a shift register 14. The shift register 14 stores the past square sum samples. The stored samples in the shift register 14 are added from the update sample to the past samples which are specified by the C/N measuring circuit 17 at the cumulating device 15 every sample. The dividing device 16 divides the summation by the value N. The number of the samples to be added at the cumulating device 15 and N of the dividing device 16 are optimized by the C/N measuring circuit 17.

The signal fade detector 4 detects the receive signal power with the average value of the averaging circuit 3. In this case, due to the shadowing between the mobile station and the satellite, the transmission power is faded by the same amount as the fade of the receive signal power. Thus, in this embodiment, the fade amount of the operation limit of the return link is set as the threshold value of the signal fade detector 4. When the average value of the receive signal power becomes lower than the threshold value, the average value is detected as the fade of the receive signal due to the shadowing.

Alternatively, based on the average receive signal power in the condition that the receive frame synchronization is established, the threshold value may be set so that the signal fade that exceeds the fade margin on the channel is detected.

The detected result of the signal fade detector 4 is sent to the control circuit 5. The interface 6 detects an off-hook state when the user place a call for telephone, facsimile or data, and sends the detected signal to the control circuit 5.

The control circuit 5 analyzes channel control information received by the receiver 1 from the network control station 21 through the forward link. When there is a call message from earth station, the control circuit 5 prepares a response signal corresponding to the call message in the data buffer 7. When the control circuit 5 detects a transmission request sent from the interface 6, the control circuit 5 prepares a call request in the data buffer 7, and transmits the data stored in the data buffer 7 from the transmitter 8 using the signaling channel.

On the other hand, while the control circuit 5 is receiving a signal through the forward link, the control circuit 5 always monitors the detection status of the signal fade detector 4.

Figure 6:
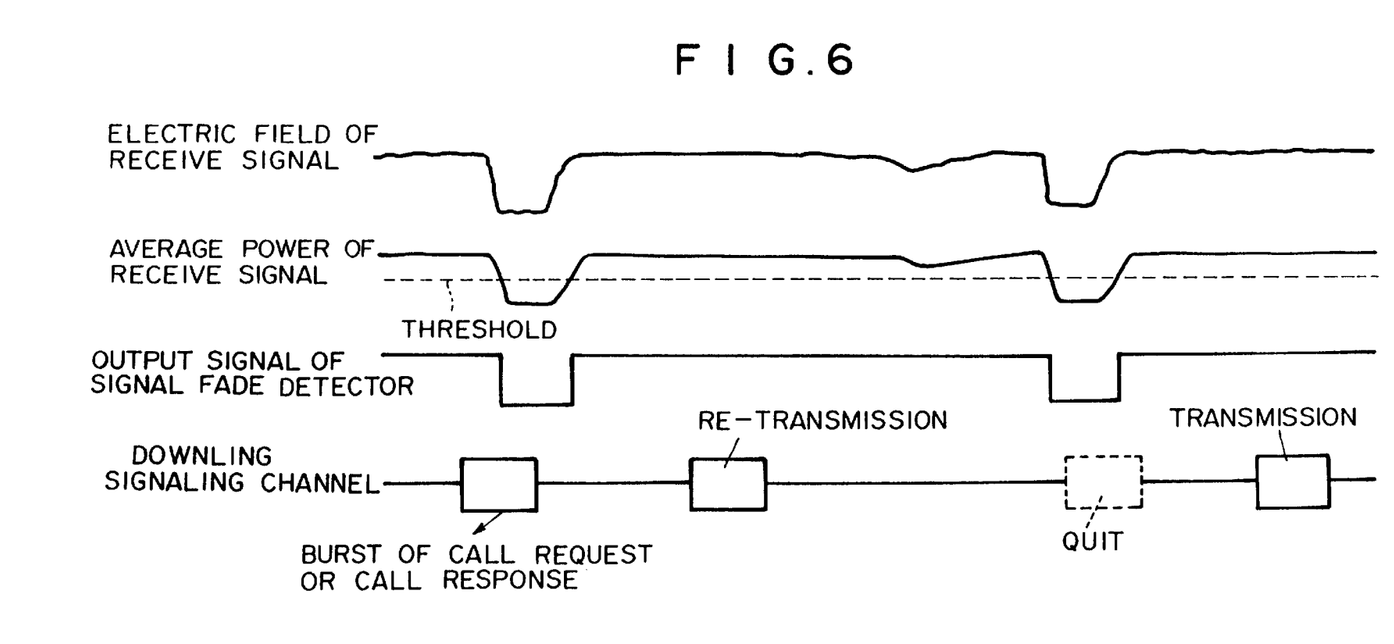
FIG. 6 is a timing chart for explaining a characteristic operation of the mobile station.

As shown in FIG. 6, when a fade of the receive signal is detected while a call request or a call response is being sent, that is, when the decrease of the receive signal power of the channel control signal that is successively sent from the network control station 21 is detected, after the power is recovered, the control circuit 5 re-transmits the call request or the call response at the time designated by the control information through the forward link as shown at a downlink signaling channel in FIG. 6.

When the fade of the receive signal is detected just before a call request or a call response is sent, that is, when the decrease of the receive signal power of the channel control signal that is successively sent from the network control station 21 is detected, the control circuit 5 stops transmitting the call request or the call response. After the power is recovered, the control circuit 5 transmits the call request or the call response at the time designated by the control information through the forward link as shown at a downlink signaling channel in FIG. 6.

Thus, in the embodiment, unlike with the A method, since transmission of a call request or a call response is controlled by the transmission environment between the satellite and the mobile station, it is not necessary to always repeat the transmission of the same information. In addition, the power consumption of a mobile station can be reduced due to less transmission. Moreover, the traffic amount of mobile stations does not increase. Thus, the probability that call requests and call responses of mobile stations conflict and interference decreases. Consequently, the call connections can be effectively performed.

Furthermore, unlike with the B method, it is not necessary to determine whether or not to re-transmit a call request or a call response at a predetermined interval. Thus, the call connecting time can be reduced.

As described above, according to the present invention, when the decrease of the receive signal power of a channel control signal is detected while a call request or a call response is being sent, after the power is recovered, the mobile station re-transmits the call request or the call response.

In addition, when the decrease of the receive signal power of a channel control signal is detected just before a call request or a call response is detected, the transmission of the call request or the call response is stopped. After the power is recovered, the mobile station transmits the call request or the call request.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A satellite communication method based on demand network assignment access, the method comprising the steps of:

detecting a receive signal power of a channel control signal successively transmitted from a network control station at a mobile station; and transmitting a call request for a call response from the mobile station, detecting a decrease of the receive signal power of the channel control signal during transmission of the call request or call response, and after the receive signal power is recovered, re-transmitting the call request or the call response from the mobile station after the receive signal power is recovered.

2. The method as set forth in claim 1, further comprising:

measuring a carrier power to noise sower ratio at the mobile station; and controlling an average amount of the receive signal power of the channel control signal corresponding to the measured carrier power to noise power ratio.

3. A communication method based on demand network assignment access, the method comprising the steps of:

detecting a receive signal power of a channel control signal successively transmitted from a network control station at a mobile station; detecting a decrease of the receive signal power of the channel control signal just before a call request or a call response is to be transmitted from the mobile station, stopping transmitting of the call request or the call response and recovering the receive signal power and after the receive signal power s recovered, transmitting the call request or the call response from the mobile station.

4. The method as set forth in claim 3, further comprising:

measuring a carrier power to noise power ratio at the mobile station; and controlling an average amount of the receive signal power of the channel control signal corresponding to the measured carrier power to noise power ratio.

5. A communication method based on demand network assignment access, the method comprising the steps of:

detecting a receive signal power of a channel control signal successively transmitted from a network control station at a mobile station;

transmitting a call request or a call response from the mobile station, detecting a decrease of the receive signal power of the network control signal during transmission of the call request or call response, recovering the receive signal power and after the receive signal power is recovered, re-transmitting the call request or the call response from the mobile station; and detecting a decrease of the receive signal power of the channel control signal just before a call request or a call response is to be transmitted from the mobile station, recovering, the receive signal power and after the receive signal power is recovered, transmitting the call request or the call response from the mobile station.

6. The method as set forth in claim 5, further comprising:

measuring a carrier power to noise power ratio at the mobile station; and controlling an average amount of the receive signal power of the channel control signal corresponding to the measured carrier power to noise power ratio.

7. A satellite communication system based on demand assignment access having a mobile station, wherein the mobile station comprises:

detecting means for detecting a receive level of a channel control signal that is successively transmitted from a network control station; and means for re-transmitting a call request or a call response, said detecting means comprising a detector for detecting, while the call request or the call response is being transmitted, when the receive level becomes less than a threshold value of the receive level, and said means for retransmitting retransmits the call request or call response after the receive level recovers to a value larger than the threshold value.

8. A communications apparatus for use with a demand assignment access satellite communications system, comprising:

detecting means for detecting a receive level of a channel control signal that is successively transmitted from a network control station; and means for re-transmitting a call request or a call response, said detecting means comprising a detector for detecting, while the call request or the call response is being transmitted, when the receive level becomes less than a threshold value of the receive level, and said means for retransmitting retransmits the call request or call response after the receive level recovers to a value larger than the threshold value.

* * * * *